UNITED STATES PATENT OFFICE.

WILLIAM F. EGER, OF FORT WAYNE, INDIANA, ASSIGNOR OF ONE-HALF TO THOMAS W. LOYD, OF FORT WAYNE, INDIANA.

CHEMICAL COMPOUND FOR TREATING WATER.

SPECIFICATION forming part of Letters Patent No. 686,688, dated November 12, 1901.

Application filed March 14, 1901. Serial No. 51,180. (No specimens.)

*To all whom it may concern:*

Be it known that I, WILLIAM F. EGER, a citizen of the United States, residing at Fort Wayne, in the county of Allen and State of Indiana, have invented certain new and useful Improvements in Chemical Compounds for Treating Water; and I do declare the following to be a full, clear, and exact description of the invention, such as will enable others skilled in the art to which it appertains to make and use the same.

My invention relates to improvements in chemical compounds for treating water; and the object of my improvements is to prepare water for use in steam-boilers and other purposes, so as to prevent the formation of scale and sediment within the boiler.

I attain my object by the composition of ingredients combined in the following proportions and used in the manner hereinafter stated.

In making my compound I use two hundred pounds of soda-ash, two hundred pounds of sal-soda, and twenty pounds of glucose, all of which are dissolved in sufficient lime-water to make of the whole fifty-two gallons.

Preferably the water to be treated is placed in a tank and the above solution is added to the water in quantities approximately one-half gallon of the solution to one hundred barrels of the water, after which the water is agitated to thoroughly mix it with the solution, and then the water is allowed to stand for a period of from fifteen minutes to an hour, during which time the impurities and objectionable foreign substances will form a precipitate, and the water may then be drawn off from the top for immediate use.

While it is preferable to treat the water before using in steam-boilers, good results may be obtained by feeding the solution in proper proportions directly into the boiler or it may be added to the water as it is fed into the boiler; but of course the sediment will then settle in the boiler and necessitate more frequent attention to remove it.

What I claim, and desire to secure by Letters Patent, is—

A composition of soda-ash, sal-soda, glucose, and lime-water, substantially in the relative proportions named, for the specified purpose.

In testimony whereof I affix my signature in presence of two witnesses.

WILLIAM F. EGER.

Witnesses:
WALTER G. BURNS,
WILLIAM R. TEETERS.